United States Patent [19]

Schulte-Werning

[11] Patent Number: 5,603,212
[45] Date of Patent: Feb. 18, 1997

[54] FUEL INJECTOR FOR A SELF-IGNITING COMBUSTION CHAMBER

[75] Inventor: Burkhard Schulte-Werning, Basel, Switzerland

[73] Assignee: ABB Management AG, Baden, Switzerland

[21] Appl. No.: 510,658

[22] Filed: Aug. 3, 1995

[30] Foreign Application Priority Data

Sep. 21, 1994 [EP] European Pat. Off. ............ 94114893

[51] Int. Cl.$^6$ ...................................................... F02C 1/06
[52] U.S. Cl. ............................. 60/39.17; 60/738; 60/261
[58] Field of Search ........................... 60/39.17, 39.182, 60/261, 264, 737, 738

[56] References Cited

U.S. PATENT DOCUMENTS

| | | | |
|---|---|---|---|
| 3,366,373 | 1/1968 | Reed | 60/39.182 |
| 3,633,361 | 1/1972 | Vanves | 60/738 |
| 3,800,530 | 4/1974 | Nash | 60/261 |
| 4,085,583 | 4/1978 | Klees | 60/261 |
| 4,180,974 | 1/1980 | Stenger et al. | 60/39.71 |
| 4,206,593 | 6/1980 | Su et al. | 60/39.17 |
| 4,730,453 | 3/1988 | Benoist et al. | 60/261 |
| 4,887,425 | 12/1989 | Vdoviak | 60/261 |
| 5,103,630 | 4/1992 | Correa | 60/39.17 |
| 5,184,460 | 2/1993 | Franciscus | 60/39.17 |
| 5,408,830 | 4/1995 | Lovett | 60/737 |
| 5,454,220 | 10/1995 | Althaus et al. | 60/39.17 |
| 5,465,569 | 11/1995 | Althaus et al. | 60/39.281 |

FOREIGN PATENT DOCUMENTS 628366 8/1949 United Kingdom ................ 60/39.17

Primary Examiner—John J. Vrablik
Assistant Examiner—Ted Kim
Attorney, Agent, or Firm—Burns, Doane, Swecker & Mathis, L.L.P.

[57] ABSTRACT

In a combustion chamber (14) of a gas-turbine group which is arranged downstream of a first turbine (11) and upstream of a second turbine (12) and has a burnerless combustion space, extending between the outflow plane of the first turbine (11) and the oncoming-flow plane of the second turbine (12), and a fuel injector (2) which comprises a fuel-nozzle holder (8), extending transversely to the main flow (1) approximately up to the center axis, and a fuel nozzle (9) arranged in the direction of flow in the center axis and connected to the fuel-nozzle holder (8), the combustion chamber (14) working with premixing combustion, and the inlet temperature of the exhaust gas of the first turbine (11) into the combustion chamber (14) being above the self-ignition temperature of the fuel (13), the fuel injector (2) has means for simultaneously evening out the velocity profile and for lowering the temperature of the flow in the wake region. These means are feed passages (5), arranged inside the fuel injector, and openings (6) for an additional mass air flow (3). Thus the formation of a region of recirculating flow, which leads to an undesirable flame effect before the actual combustion zone, is prevented.

3 Claims, 4 Drawing Sheets

5,603,212

FUEL INJECTOR FOR A SELF-IGNITING COMBUSTION CHAMBER

FIELD OF THE INVENTION

The invention relates to a secondary combustion chamber, working with premixing combustion with a low content of pollutants, of a gas-turbine group and to a method of operating a secondary combustion chamber.

BACKGROUND

Certain secondary combustion chambers for stationary gas turbines, the temperature of the entering working gas is above the self-ignition temperature for the gaseous or liquid fuel. These combustion chambers are typically configured for premixing combustion with a low content of pollutants and have internal fittings which cause a wake in the gas flow giving rise to the risk of undesirable flame retention.

Fuel injectors, as an example of a component integrated in a gas-turbine combustion chamber, are often formed with a curved feed part exposed to the combustion-chamber flow. The fuel-nozzle holder which is disposed transversely to the main flow forms a wake region with recirculating flow just like the blunt end of the nozzle itself. At this location, that is, in the wake region behind the transversely disposed part of the lance-like fuel injector, an inadequately mixed fuel/air mixture can be transported upstream by the locally recirculating flow behavior. Consequently, instead of a premixing flame, a diffusion flame having higher pollutant production then appears in the wake. The flame burns in a stable manner in this wake region, since fuel is constantly transported by the flow recirculation from the injection point into the wake region.

The disadvantage of this prior art is that pollutant formation, compared with the intended premixing combustion downstream of the fuel injector, is usually clearly increased in such a flame due to the relatively long retention times in the combustion zone and the high flame temperature. This effect is undesirable in view of the progressively stricter requirements imposed on pollutant emission.

The thermal loading of the component (e.g. the fuel injector) can likewise increase and thus necessitate more expensive cooling of the component wall.

SUMMARY OF THE INVENTION

Accordingly, one object of the invention, in attempting to avoid all these disadvantages, is to provide a novel tight combustion chamber, i.e. without additional air such as film cooling, working with premixing combustion and having a low content of pollutants. A combustion chamber a combustion space for self-ignition of fuel and a lance-shaped fuel injector arranged transversely to the main flow. In a combustion chamber of the invention, the formation of the flame in the wake of the fuel injector, that is, well away from the actual combustion zone, is suppressed.

According to the invention, this is achieved in a combustion chamber of a gas-turbine group when the fuel injector includes means for simultaneously evening out the velocity profile and for lowering the temperature of the flow in the wake region of the fuel injector. These means are advantageously feed passages for guiding an additional mass air flow. The feed passages are arranged inside the fuel injector and are connected to discharge openings which are located in the part of the fuel nozzle located downstream, the openings being directed in the direction of the main flow and their size being about 1 mm.

The advantages of the invention can be seen, inter alia, in the fact that the undesirable flame-retention effect is reduced and yet good mixing of additional air and main mass flow before the fuel feed or combustion is achieved, so that the pollutant emissions are reduced. Furthermore, additional thermal loading of the component is prevented.

Furthermore, in a combustion chamber having a lance-shaped fuel injector in which there is only a small distance (less than five times the holder diameter) between the nozzle holder and the actual fuel nozzle in the direction of the main flow an undesirable flame-retention effect can be expected even in the wake of the fuel-nozzle holder. It is advantageous if additional discharge openings connected to the feed passages are arranged in at least one row in the part of the fuel-nozzle holder located downstream.

In the method of operating the combustion chamber according to the invention, an additional mass air flow is discharged through the discharge openings into the combustion chamber before the actual combustion zone in the wake of the part of the fuel injector disposed transversely to the main flow, the size of the mass air flow being <0.5% of the mass flow of the hot gas.

It is especially convenient when the additional mass air flow is extracted from the heated combustion-chamber cooling air.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements essential for understanding the invention are shown. The direction of the media is designated by arrows.

DESCRIPTION OF THE PREFERRED EMBODIMENTS

Figure 1:
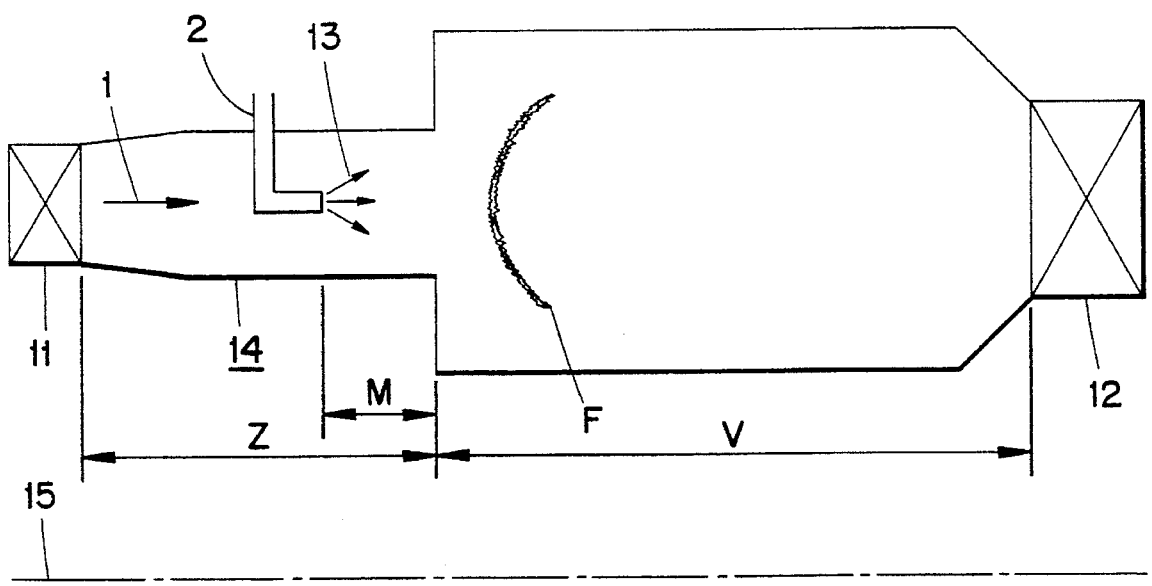
FIG. 1 shows a longitudinal section of the schematically represented secondary combustion chamber of the gas turbine.

Referring now to the drawings, wherein like reference numerals designate identical or corresponding parts throughout the several views, in FIG. 1 a secondary combustion chamber 14 integrated in a gas turbine process is schematically shown in overview. The secondary combustion chamber 14 is arranged downstream of a compressor unit (not shown here) having an adjoining first combustion chamber (likewise not shown) and a first turbine 11 acting downstream of the first combustion chamber. A second turbine 12 then acts downstream of the secondary combustion chamber 14.

The hot exhaust gas 1 of the first turbine 11 is admitted to the secondary combustion chamber 14. The secondary combustion chamber 14 comprises a self-ignition combustion space, i.e. without ignition devices or pilot burners, which extends between the outflow plane of the first turbine 11 and the oncoming-flow plane of the second turbine 12. The combustion chamber preferably has essentially the form of a continuous, annular, axial or quasi-axial cylinder, which is apparent from the center axis 15, and is composed of an inflow zone Z with mixing zone M and a combustion zone V. The combustion chamber 14 can also comprise a number of axially, quasi-axially or helically arranged tubes or ducts forming individual self-contained combustion spaces.

A plurality of lance-shaped fuel injectors 2 are arranged in the peripheral direction of the annular cylinder forming the combustion chamber, which fuel injectors 2 are connected to one another, for example, via a ring main (not shown) and through which the fuel 13 is mixed into the hot-gas flow.

Gaseous fuels, for example natural gas, or oil/water emulsions are used as fuel 13, in which case preference should be given to the natural-gas operation on account of the constantly increasing demands for low NOx emissions, since very low NOx values can be achieved here. Premixing combustion with a low content of pollutants takes place in the secondary combustion chamber 14. The inlet temperature of the gases entering the combustion chamber is very high, for the hot gas (exhaust gas of the first turbine) has a temperature of about 1000° C. This temperature is thus higher than the self-ignition temperature of the fuel.

Intensive mixing of the fuel 13 with the hot gas 1 takes place in the mixing section M. With regard to combustion with a low content of pollutants, provision must now be made for the flame F to burn in a stable manner only downstream of the mixing section M and not in the wake of the fuel injector 2, since otherwise the disadvantages mentioned in the prior art will occur. For this reason, an oil/water emulsion is also used instead of pure oil during operation with liquid fuel, since this oil/water emulsion ignites later than pure oil.

Figure 2:
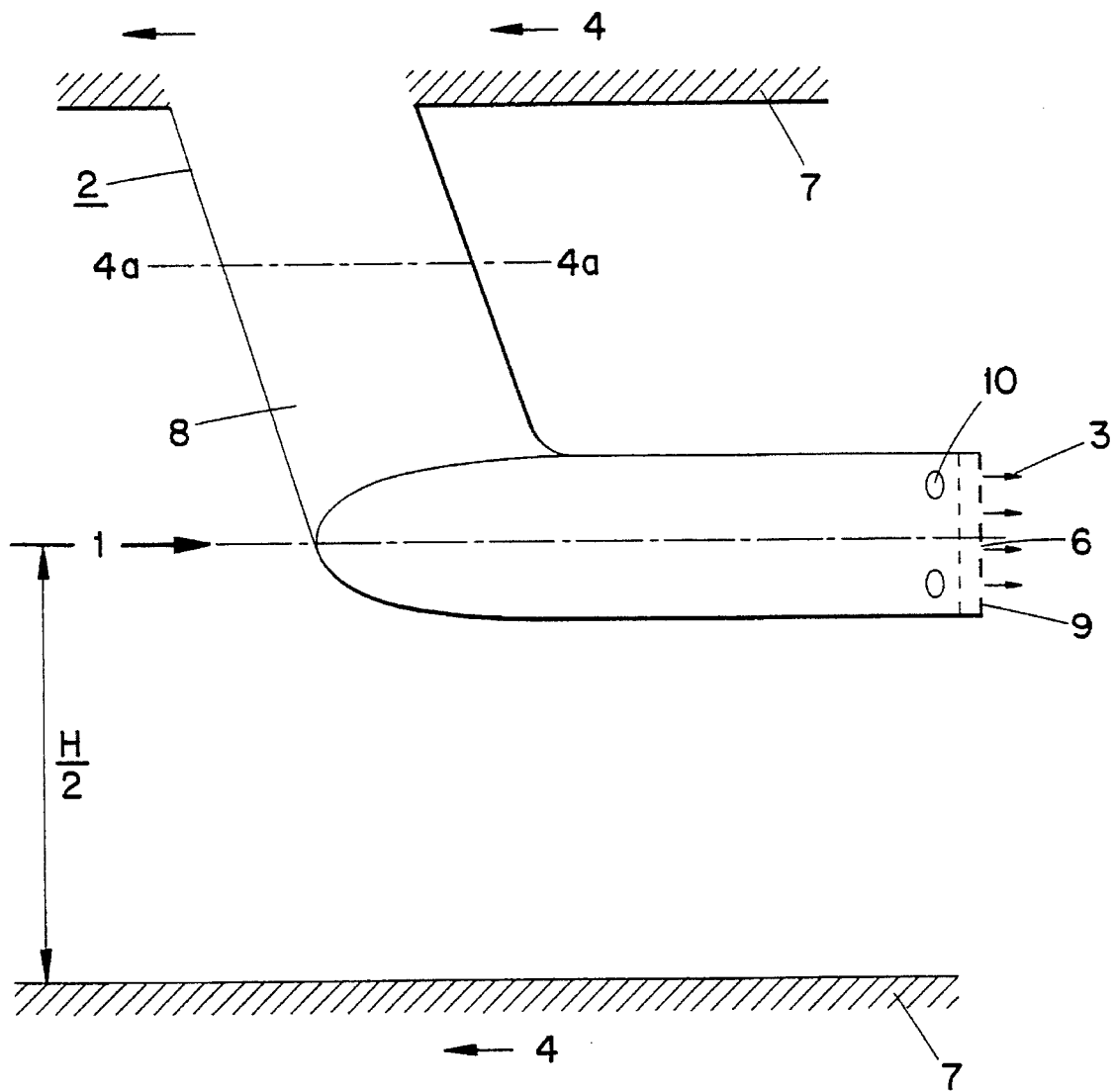
FIG. 2 shows a partial longitudinal section of the combustion chamber in the area of the lance-shaped fuel injector, there being a relatively large distance between the fuel-nozzle holder and the actual fuel nozzle in the direction of flow.

FIG. 2 shows an enlarged partial longitudinal section of the secondary combustion chamber 14 in the area of the fuel injector 2. The lance-shaped fuel injector 2 is passed through the combustion-chamber wall 7. The wall 7 is cooled in a purely convective manner by a cooling-air flow 4 to protect it from overheating and has no openings for the ingress of, for example, film cooling air into the interior of the secondary combustion chamber 14. The fuel injector 2 comprises a fuel-nozzle holder 8 and a fuel nozzle 9. The cylindrical fuel-nozzle holder 8 is disposed transversely to the main flow 1 of the combustion chamber 14 and extends to the center of the combustion chamber, i.e. up to H/2, so that the adjoining fuel nozzle 9 is located in the center of the main flow 1.

In the exemplary embodiment shown in FIG. 2, there is a relatively large distance in the direction of flow between the fuel-nozzle holder 8 and the actual fuel nozzle 9. This distance should be more than 5 times the holders-diameter, which is not shown to scale in FIG. 2. This ensures that although the fuel-nozzle holder 8 disposed transversely to the main flow 1 certainly forms a region of recirculating flow, this recirculation region can be neglected, for no undesirable flame-retention effect occurs here. The large distance from the injection point 10 of the fuel 13 prevents fuel from being transported into this region.

But the behavior is different in the wake region of the fuel nozzle 9. At this location, a recirculating flow having a lower flow velocity compared with the flame velocity normally occurs without the means according to the invention. Recirculating flow is the cause of the stabilization of an undesirable flame in this region. An inadequately mixed fuel/air mixture is transported upstream by the locally recirculating flow behavior and thus does not participate in the premixing combustion with a low content of pollutants which takes place downstream. Instead, a diffusion flame having a substantially higher pollutant production appears in the wake of the fuel nozzle 9.

Figure 3:
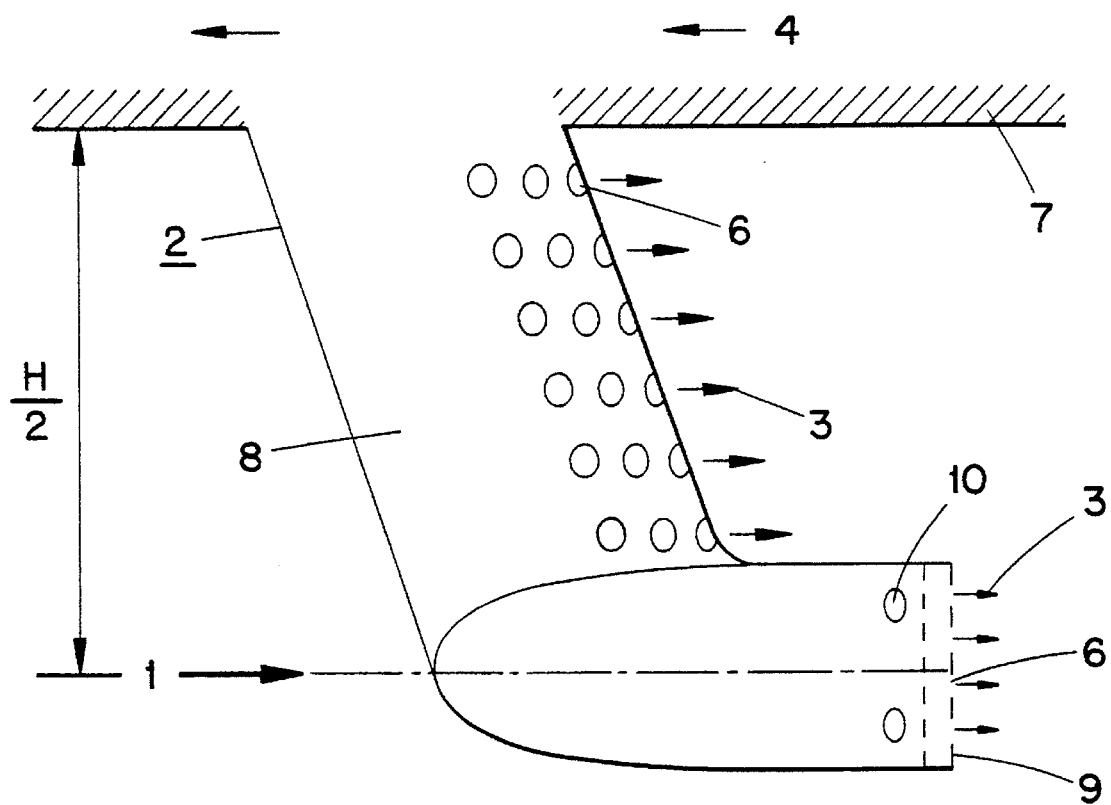
FIG. 3 shows a partial longitudinal section of the combustion chamber in the area of the lance-shaped fuel injector, there being a relatively small distance between the fuel-nozzle holder and the actual fuel nozzle in the direction of flow.

The undesirable region of the recirculating flow is reduced or completely removed if there are means in the fuel injector 2 which lead to evening-out of the velocity profile and to simultaneous lowering of the temperature in the wake region of the fuel nozzle 9. These means are the air-feed passages 5 and the discharge openings 6 which are shown in FIGS. 2 to 4 and are arranged inside the fuel injectors and through which an additional mass air flow 3 is fed into the combustion chamber 14. Here, the discharge openings 6 are arranged in the downstream part of the fuel nozzle 9.

The additional mass air flow 3 mixes, for example, with a specially prepared natural-gas jet coming out of the injection point 10. Since the air discharge is effected upstream of the flame, that is, before the actual combustion zone, this air is also mixed in and does not disturb the premixing combustion but participates fully in the combustion and thus does not lead to an indirect increase in the pollutant values.

In this exemplary embodiment the additional mass air flow 3 is extracted from the heated combustion-chamber cooling air 4. The additional air 3 can of course also be extracted from other air flows; for example it can be extracted from a plenum arranged outside the combustion chamber.

Depending on the discharge rate, the necessary reduction in the flame-retention effect can thus be achieved while additional mass air flow 3 and main mass flow 1 are nonetheless readily mixed before the injection point 10 for the fuel or before the combustion. The discharge rate is to be proportioned in such a way that the discharged mass air flow is <0.5% of the mass flow of the hot gas.

Figure 4A:
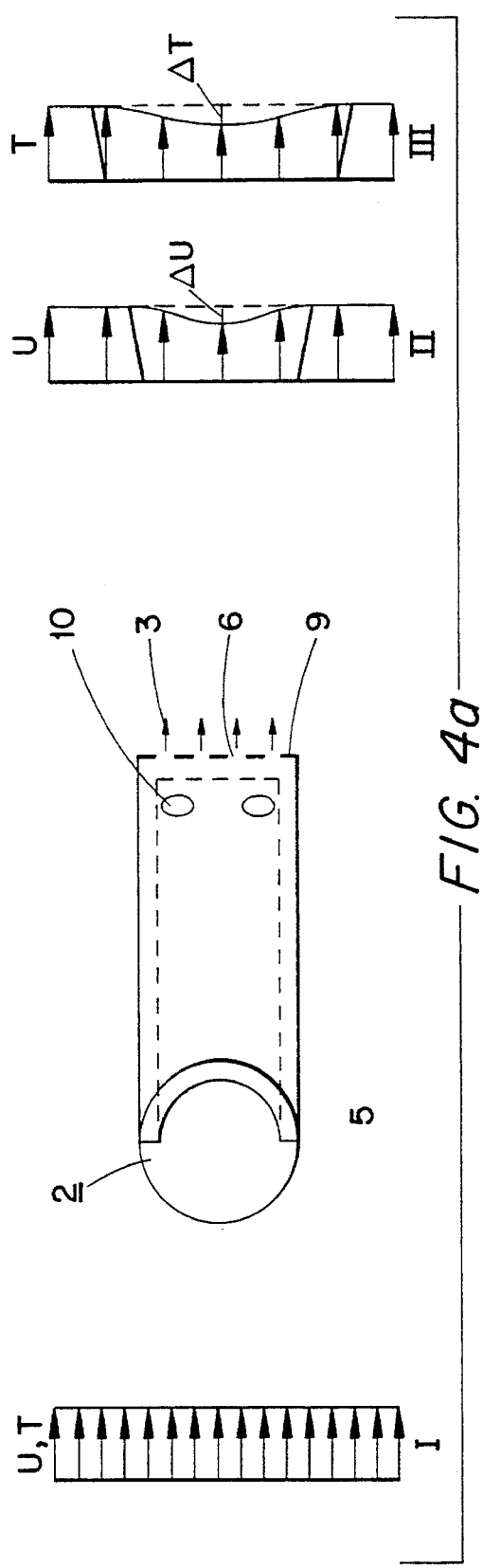
FIG. 4a shows a cross section according to FIG. 2 with additional schematic representation of the temperature and velocity profile upstream of the fuel injector and downstream of the fuel injector, i.e. in the wake.

FIG. 4a shows a partial cross section of FIG. 2. The temperature and velocity profile of the main flow 1 before the flow strikes the lance-shaped fuel injector 2 is designated by Roman numeral I, the velocity profile in the wake is designated by Roman numeral II, and the temperature profile in the wake is designated by Roman numeral III. Mixing effects of the fuel jet are not shown.

Figure 4B:
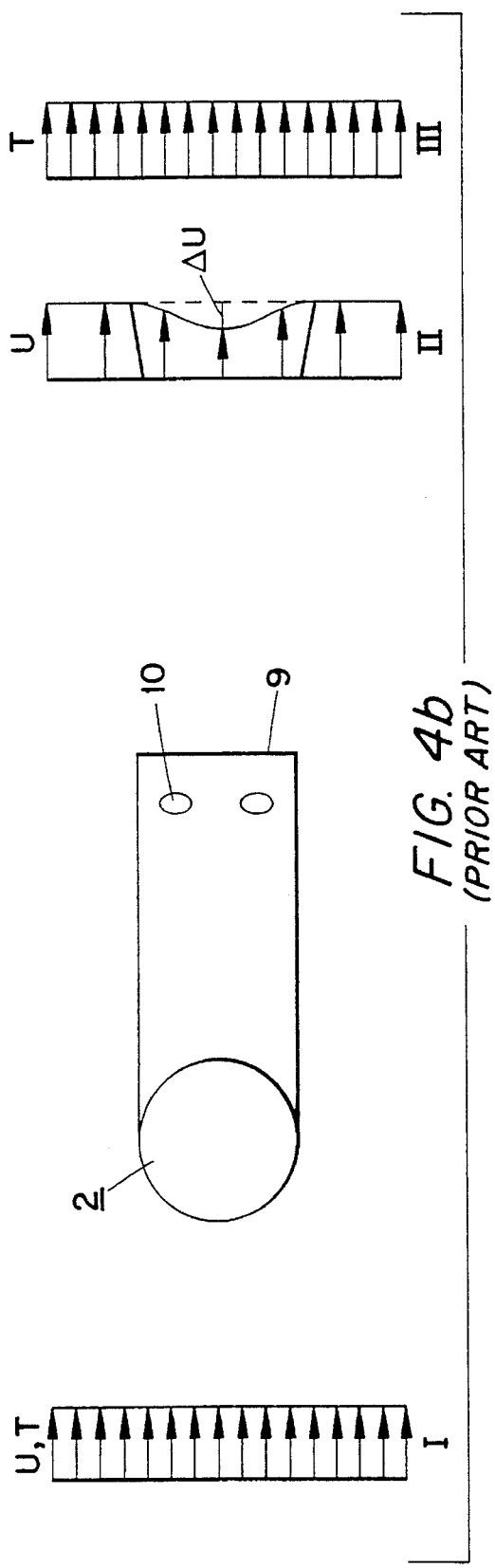
FIG. 4b shows a representation analogous to FIG. 4a, but without influencing of the wake, i.e. according to the prior art.

FIG. 4b shows for comparison the corresponding profiles according to the prior art to date. Two positive effects are achieved by the invention: the reduction in the flow velocity as a result of the internal fittings is reduced, for example the velocity difference $\Delta U$ is halved compared with the prior art, and the temperature in the wake is lowered, i.e. a temperature difference $\Delta T$ is introduced. Thus the ignition delay time increases, that is, the time up to self-ignition, and better intermixing of fuel and hot gas can take place.

A further exemplary embodiment is shown in FIG. 3. In the lance-shaped fuel injector 2 depicted here, the distance between the fuel-nozzle holder 8 arranged transversely to the main flow 1 and the actual fuel nozzle 9 is substantially smaller than in the exemplary embodiment shown in FIG. 2. This means that the fuel-nozzle holder 8, like the blunt end of the fuel nozzle 9 itself, forms a region with recirculating flow. In order to suppress a flame-retention effect in the wake of the fuel-nozzle holder 8, further discharge openings 6 connected to the feed passages 5 must therefore be arranged in the part of the fuel-nozzle holder 8 located downstream. These discharge openings 6 are advantageously made in a plurality of rows.

A further advantage of the invention results from the fact that the additional mass air flow 3 also contributes at the same time to any requisite cooling of the fuel-nozzle holder 8 and the fuel nozzle 9.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a combustion chamber of a gas-turbine group which is arranged downstream of a first combustion chamber and turbine and upstream of a second turbine, the combustion chamber defining a mixing space upstream of a combustion space for self-ignition of a fuel, the combustion chamber extending between an outflow plane of the first turbine and an oncoming-flow plane of the second turbine, and a lance-shaped fuel injector which comprises a fuel-nozzle holder extending into the mixing space transversely to a main flow direction approximately to a center axis of the mixing space, and a fuel nozzle arranged in the main flow direction in the center axis and connected to the fuel-nozzle holder, wherein the combustion chamber operates with premixing combustion and without film cooling air, and wherein an inlet temperature of exhaust gas of the first turbine flowing into the combustion chamber is above a self-ignition temperature of a fuel delivered to the fuel injector, the invention comprising:

means in the fuel injector for simultaneously evening out a velocity profile and for lowering a temperature of the main flow in a wake region immediately downstream of the fuel injector and for reducing recirculation in the wake region such that premixing occurs prior to self-ignition of the fuel in the combustion space.

2. The combustion chamber as claimed in claim 1, wherein the means for evening out the velocity profile and for lowering the temperature of the flow comprise feed passages for guiding an additional mass air flow, which feed passages are arranged inside the fuel injector and are connected to discharge openings located in a downstream part of the fuel nozzle, the openings being directed in the direction of the main flow and having a diameter about 1 mm.

3. The combustion chamber as claimed in claim 2, wherein, the fuel injector has an axial distance between the fuel-nozzle holder and the fuel nozzle less than 5 times a holder diameter, and wherein additional discharge openings connected to the feed passages are arranged in at least one row in a downstream part of the fuel-nozzle holder.

* * * * *